United States Patent
Przywecki

(10) Patent No.: US 8,076,908 B2
(45) Date of Patent: Dec. 13, 2011

(54) METHOD FOR CONTROLLING A VEHICLE ELECTRIC SYSTEM INCLUDING A STORAGE CAPACITOR FOR BRIEF SUPPLY OF ELECTRICAL POWER ON DEMAND

(75) Inventor: Frank Przywecki, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 814 days.

(21) Appl. No.: 12/121,510

(22) Filed: May 15, 2008

(65) Prior Publication Data

US 2008/0211453 A1 Sep. 4, 2008

Related U.S. Application Data

(63) Continuation of application No. PCT/EP2006/011015, filed on Nov. 16, 2006.

(30) Foreign Application Priority Data

Nov. 18, 2005 (DE) .......................... 10 2005 055 004

(51) Int. Cl.
*H02J 7/00* (2006.01)
*H02J 7/34* (2006.01)
(52) U.S. Cl. .............. 320/167; 320/166; 307/44; 307/48
(58) Field of Classification Search .................. 320/166, 320/167; 307/44–48
See application file for complete search history.

(56) References Cited

U.S. PATENT DOCUMENTS 6,384,489 B1 * 5/2002 Bluemel et al. .............. 307/10.1
7,456,531 B2 * 11/2008 Yagi ............................ 310/68 R

FOREIGN PATENT DOCUMENTS

| DE | 198 59 036 A1 | 6/2000 |
| EP | 0 652 621 A2 | 5/1995 |
| EP | 1 595 748 A1 | 11/2005 |

OTHER PUBLICATIONS

International Search Report dated Feb. 16, 2007 With English translation (Four (4) pages).
German Search Report dated Sep. 6, 2006 with English translation (Ten (10) pages).

* cited by examiner

*Primary Examiner* — Richard V Muralidar
(74) *Attorney, Agent, or Firm* — Crowell & Moring LLP

(57) ABSTRACT

A method for controlling the electrical system of a motor vehicle with a generator, a battery to supply the electrical system, at least one load and a storage capacitor for brief supply of electrical power on demand, during which the battery is charged when the generator produces excess electrical power is provided. The load is supplied and the battery and the storage capacitor are charged by the generator in load operation or fuel cutoff. The load is additionally supplied by the battery and/or the storage capacitor when the instantaneous generator power is not sufficient. An instantaneously required electrical load power in load operation or fuel cutoff is recorded the load power is compared with an idle power of the generator, and the storage capacitor is charged by the generator when the idle power of the generator is less than the load power in load operation or fuel cutoff.

19 Claims, 3 Drawing Sheets

METHOD FOR CONTROLLING A VEHICLE ELECTRIC SYSTEM INCLUDING A STORAGE CAPACITOR FOR BRIEF SUPPLY OF ELECTRICAL POWER ON DEMAND

CROSS REFERENCE TO RELATED APPLICATIONS

This application is a continuation of PCT International Application No. PCT/EP2006/011015, filed Nov. 16, 2006, which claims priority under 35 U.S.C. §119 to German Patent Application No. 10 2005 055 004.5, filed Nov. 18, 2005, the entire disclosures of which are herein expressly incorporated by reference.

BACKGROUND AND SUMMARY OF THE INVENTION

The invention concerns a method for controlling the electrical system of a motor vehicle.

The number of electrical loads in motor vehicles continues to increase. Even today, electrical loads, like starter, headlights and interior lighting, radio and cell phone, power windows and air conditioning, outside mirror adjustment and seat adjustment, as well as central locking, are standard equipment in a vehicle, and it is foreseeable that additional electrical loads will be added in future vehicles. These loads must all be supplied with electrical power.

For power supply to electrical loads, an electrical system is present in each motor vehicle, to which, on one side, all electrical loads and, on the other side, generally a generator and a battery are connected as a power source. While the generator is driven by the internal combustion engine of the vehicle and provides electrical power when the engine is running, the system battery serves as additional power storage that is mostly loaded during the starting process of the internal combustion engine, but which also serves as a buffer when the generator alone is not capable of providing the required electrical power. This is the case, for example, at low generator speed and when a number of loads are connected.

The generator and system battery must be designed accordingly to maintain power supply to these loads.

In order to cushion short-term requirements on a power supply without having to design the generator and battery larger on this account, an additional charge accumulator is proposed in German patent document DE 198 59 036. In the electrical system for a motor vehicle according to DE 198 59 036, a secondary system is connected in parallel to the primary system, including a generator, a system battery and at least one load, the secondary system having a controllable DC/DC converter connected to a supercapacitor. The supercapacitor, depending on the operating state of the vehicle, is charged or discharged. Under unfavorable operating conditions, the power stored in the supercapacitor can be made available to the electrical system. The load on the system battery is reduced on this account.

A shortcoming in this prior art consists, among other things, of the fact that the emphasis is on recuperatively produced power, i.e., power recovered when the vehicle is braked by the generator. If, however, too many loads depend on the electrical system, overloading of the generator can occur.

The task of the present invention is to provide a method for controlling an electrical system for a motor vehicle, with which it is ensured that the generator is not overloaded.

The solution of the above task according to the present invention is based on the finding of the inventor that under-supply of the electrical system generally occurs when the generator operates at low speeds. A low speed, especially in idle, is frequent during cold starting in winter or during so-called stop-and-go operation with the air conditioning engaged in summer. On the electrical side, the generator is then up to 100% loaded, since heaters are switched on in the winter and additional loads are connected. These can no longer be supplied at low speeds of the generator. The battery assumes supply or individual loads, which, under some circumstances, can no longer be supplied and must necessarily be removed from the electrical system, in order to avoid interruption of power supply.

During an increase in speed, for example, during starting, the generator also remains 100% loaded, but now it can cover the entire demand for electrical power, i.e., switched-off loads can now be gradually switched on. When the speed rises still further, electrical power is generated that is no longer directly required, i.e., excess power is available. This excess power can now be used, in the first place, to charge the battery and, in the second place, stored for later use in the storage capacitance. In a subsequent idle phase, the storage capacitor is discharged again. This prevents the battery from being loaded in cycles.

The method according to the invention controls an electrical system of a motor vehicle with a generator, a battery to supply the electrical system, at least one load and a storage capacitance for brief furnishing of electrical power as required, during which the battery is charged when the generator produces excess electrical power. According to the method, at least one load is supplied and the battery and the storage capacitor are charged by the generator in load operation or during fuel cutoff in the overrun. The at least one load is additionally supplied by the battery and/or the storage capacitor when the instantaneous generator is not sufficient. An instantaneous required electrical load power in load operation or fuel cutoff is recorded, and the load power with a no-load power of the generator and charging of the storage capacitor by the generator when the no-load power of the generator is less than the load power during load operation or fuel cutoff in the overrun is compared.

In an exemplary embodiment of the invention, one, or if technically possible, several of the following features are also implemented:

the storage capacitor is charged by the generator when the no-load power of the generator is smaller than the load power by a stipulated amount;

the storage capacitor is charged by the generator during fuel cutoff;

both the storage capacitor and the battery are charged by the generator when the power that can be maximally transferred from the generator to the storage capacitor is less than the difference between the instantaneous power of the generator and the load power;

follow-up loads and standby loads are supplied after engine stop by the storage capacitor;

the battery is charged by the storage capacitor after engine stop;

the battery is charged by the storage capacitor when its charge state drops below a threshold value and excess charge is available in the storage capacitor;

the process is automatically restarted at stipulated time intervals.

The solution according to the invention has the following advantages, among others. The charge balance is improved with a simultaneous increase in battery lifetime, since fewer charging/discharge cycles must be accomplished by the battery. The battery size and generator size can optionally be reduced as a function of the under-coverage frequency, the loads and the size of the storage capacitor and the DC/DC converter.

Other objects, advantages and novel features of the present invention will become apparent from the following detailed description of the invention when considered in conjunction with the accompanying drawings.

BRIEF DESCRIPTION OF THE DRAWINGS

The invention is explained below with reference to the accompanying drawings, in which exemplary embodiments of the invention are shown.

DETAILED DESCRIPTION OF THE DRAWINGS

In the following description, load operation is understood to mean that the engine is operating and the drive train is closed. Fuel cutoff is understood to mean that the engine is not operating, and that the drive train is closed. Idle is understood to mean that the engine is running and the drive train is interrupted.

Figure 1:
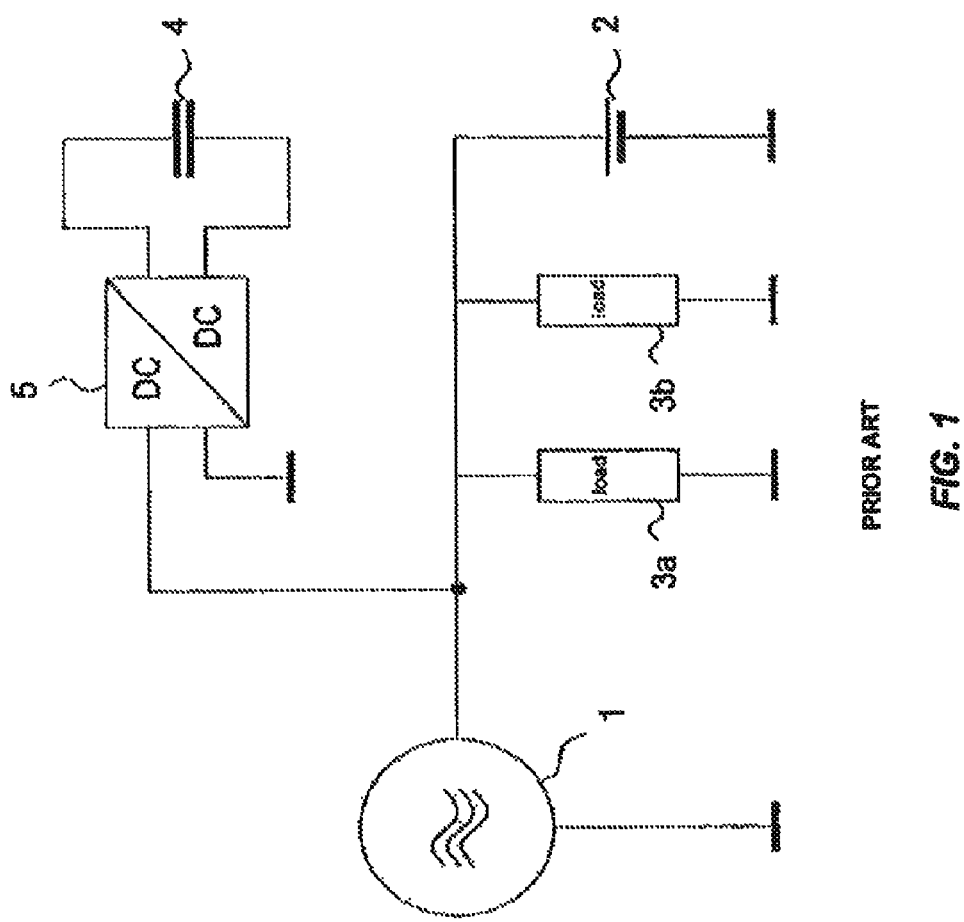
FIG. 1 schematically depicts the structure of an electrical system for a motor vehicle according to the prior art.

FIG. 1 schematically depicts the structure of an electrical system for a motor vehicle according to the prior art. The electrical system includes a generator 1 and a battery 2 to supply the loads that are connected to the electrical system. Two loads 3a and 3b are symbolically shown in FIG. 1. These can be the starter and the air conditioner. During starting of the vehicle, the starter 3a must be supplied with current, in order to start the internal combustion engine. The electrical power for this is furnished by battery 2. If, at the same time, for example, an air conditioner 3b is also engaged, during starting of the vehicle, an overload of generator 1 can occur and therefore loading or overloading of battery 2. To cover brief loads, a storage capacitor 4 is additionally provided in the prior art, which can briefly supply electrical power as required, if the generator 1, possibly together with battery 2, cannot cover this requirement.

In the prior art, the generator 1 during load operation assumes supply of loads 3a and 3b in the electrical system. When the generator 1 generates excess electrical power beyond this, which is especially the case during longer load operation, the battery 2 is initially charged.

The storage capacitor 4, which serves to cover brief demands, is charged in the prior art during fuel cutoff (overrun) of the internal combustion engine. During fuel cutoff, the internal combustion engine and therefore the generator 1 are driven by the inertia of the vehicle. Since no fuel-air mixture is fed to the internal combustion engine in this phase, the vehicle is braked by the internal combustion engine. Owing to the fact that electrical power is still taken from generator 1 in this phase to charge the storage capacitor 4, this braking effect is further intensified. The advantage of this type of charging of the storage capacitor 4 lies in the fact that no additional fuel need be consumed to charge the storage capacitor 4.

For electrical adjustment of the electrical system and storage capacitor 4, a DC/DC converter 5 is provided in front of the storage capacitor 4. This is generally laid out for power that corresponds to the expected demand for charging the storage capacitor 4.

While the generator in load operation can furnish more power than the electrical system requires, in idle, however, or at an engine speed close to idle, under-coverage of the electrical system demand can occur. This situation is recognized according to the invention by a control (not shown) and, depending on the operating state of the vehicle, excess power is furnished by the generator to the storage capacitor via the DC/DC converter, in order to supply it as required. If the range near idle is again approached and the switched-on load can then presumably no longer be supplied by the generator 1, the electrical system is fastened on the storage capacitor 4, in addition to generator 1. The corresponding control method according to the invention is explained below with references to FIGS. 2 and 3.

Figure 2:
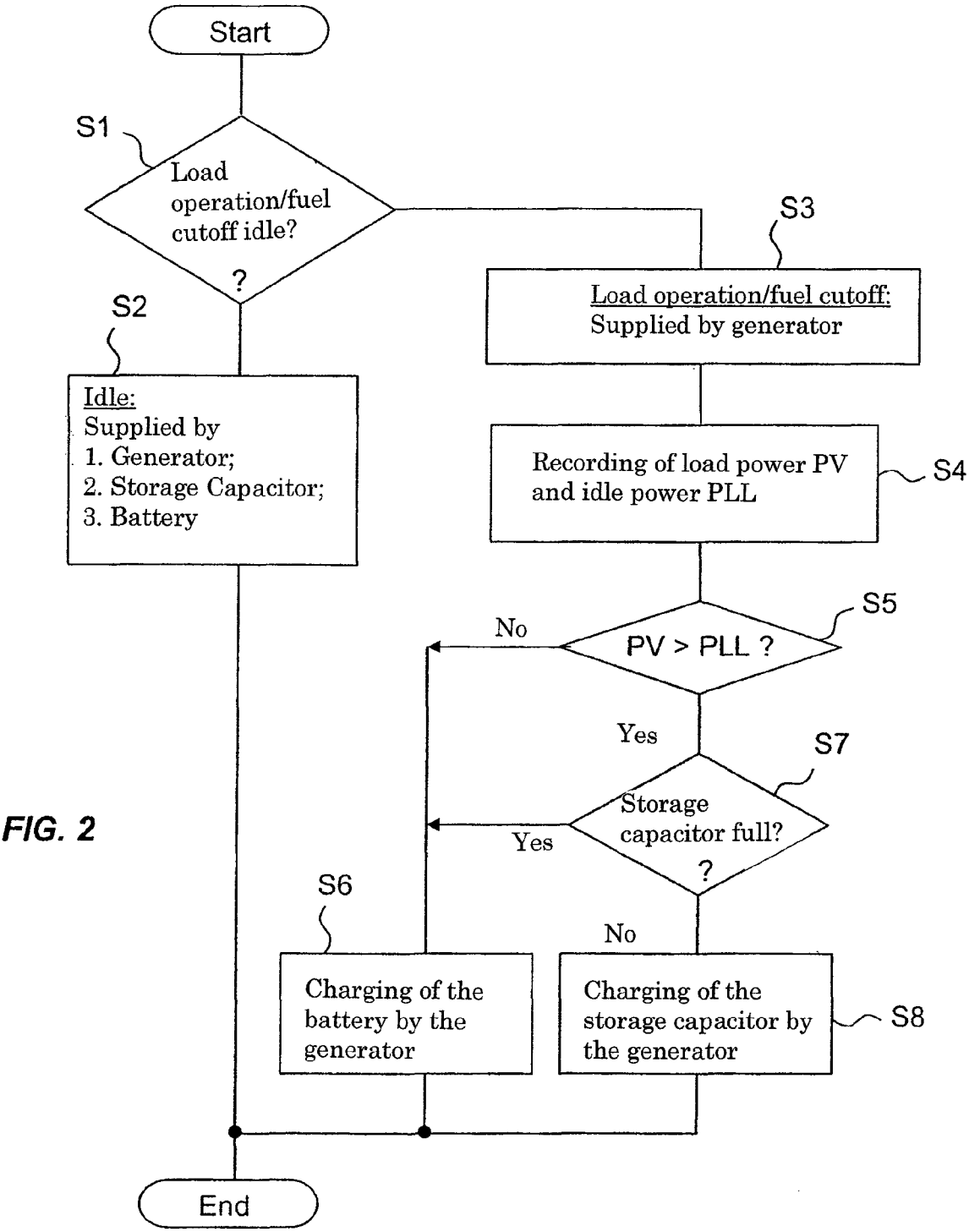
FIG. 2 shows a flow chart of a first variant of the method according to the invention.

In the variant of the method according to the invention for controlling the power supply of the electrical system of the vehicle according to FIG. 2, it is checked at the beginning at step S1, in which type of operation the vehicle is found, i.e., whether it is in load operation, fuel cutoff or idle.

If the vehicle is in idle, i.e., the engine is running, but the drive train is interrupted, supply of loads 3a, 3b occurs in step S2, so that initially the generator 1 is loaded. If its power is no longer sufficient, the storage capacitor 4 is loaded next, in order to supply the load with the required electrical power. Only when this is also no longer sufficient is electrical power furnished from battery 2. This achieves a situation in which the battery is only loaded when it is unavoidable; the battery is therefore spared to this extent.

If, on the other hand, it is found in step S1 that the vehicle is in the operating state load operation or fuel cutoff, it is assured that the generator 1 is driven, be it by the engine in load operation or by the movement of the vehicle in fuel cutoff, by its own inertia. In these two cases, the electrical power generated by the generator 1 can be divided between the loads and the accumulators (battery 2 and storage capacitor 4).

In order to ensure optimal use of the excess power generated by generator 1, the instantaneous load power PV and the no-load power PLL of the generator are determined in step S4. The instantaneous load power PV depends on which loads are supplied with electrical power at the moment of this recording via the electrical system. The load power therefore differs from case to case. The no-load power of the generator, on the other hand, is a fixed quantity that is entered, for example, by the generator manufacturer, in a (not shown) memory, which is read out in step S4. The two quantities PV and PLL are compared with each other in step S5. It can be predicted, by means of the comparison result, whether the generator can adequately supply the vehicle system with loads 3a, 3b in a subsequent idle operation.

If the power of the generator is also sufficient in idle to supply all loads connected at that time, the excess power on step S6 is used, in order to charge battery 2, as in the prior art. The method according to the invention is then completed for the time being. A possible continuation of the method after step S6 is described further below.

If, on the other hand, it is found in step S5 that the generator power is not sufficient in idle, the excess power of the generator is utilized during load operation or in fuel cut-off as follows. For example, in load operation at 5000 revolutions per minute, an electrical power of 1.9 kW is instantaneously consumed. The generator is designed for 2.4 kW at 5000 rpm, so that it alone can cover this demand without problem. In idle at less than 900 rpm, the generator, on the other hand, only still delivers a power of 1.6 kW. The 300 W difference between the actual (instantaneous) demand and the generator power in idle is furnished according to the invention by the storage capacitor 4, in order to spare the battery. For this purpose, the storage capacitor 4 must have the corresponding charge. This charge is generated in the storage capacitor 4 with the excess power of the generator.

If it is established in step S5 that the generator power PLL in idle is not sufficient, in order to cover the load power PV, the method jumps to steps S7 and S8, in order to charge the storage capacitor 4. It is then checked in step S7 whether charging of the storage capacitor is necessary and possible at all. If this is not the case, the battery is charged again in step S6, since the excess power of the generator cannot be used otherwise. However, if it is found in step S7 that the storage capacitor 4 is not fully charged, the excess power of the generator is used in step S8 for storage of excess power of the generator.

It is understood by one skilled in the art that the query in step S5 need not be restricted to a pure size comparison. Value ranges can be established, instead of the pure numbers PV and PLL. For example, the load power, in the interest of safety, can be increased by a stipulated amount $\Delta P$, in order to be able to also cover possible switching-on of additional equipment right after recording of the actual load power PV on the transition to the next idle operation, i.e., the storage capacitor 4 is then also already charged by generator 1 when the idle power PLL of the generator is still greater than the load power PV by a (small) predetermined amount $\Delta P$. In this way, the query S5 also responds when no immediate demand still exists, but this is not unlikely.

With these previously described steps of the method, it is ensured that the storage capacitor 4 can engage for brief demands and provide the required electrical power.

Step S8 preferably has the following modifications (not explicitly shown in the figures). The power that can be transferred from generator 1 to storage capacitor 4 might be limited. For example, this is the case, if the maximum admissible power of the DC/DC converter 5 is surpassed. If the power that is available from the generator 1 for charging of the storage capacitor 4 exceeds this limit value, only part of the excess power of the generator is used to charge the storage capacitor 4 and the other part of the power of the generator is used to charge battery 2. Charging of the storage capacitor 4, in this case, is therefore extended over time.

On the other hand, charging can be completed after a relatively short time during step S8. In this case, a new decision must be made on use of generator power. Step S8 may therefore be interrupted after a stipulated period and the method jumps back to the query in step S1, in order to check the branches in steps S1, S5 and S7 again. This applies mutatis mutandis also for charging of the battery in step S6. In other words, the method is automatically restarted at stipulated time intervals. These jump-back loops from S6 and S8 to S1 are not explicitly shown in FIG. 2.

Additional steps of the method according to the invention are therefore switching-on the storage capacitor 4 in idle operation, if the generator power is not sufficient, as well as charging of the storage capacitor 4 by the generator 1 during load operation/fuel cutoff, if excess power is available. With this control method, the case, in which, during a cold start, especially in winter, undersupply of the electrical system can occur in idle, is taken into account, during which the generator utilization is 100% and additional consumers are switched-on that can no longer be supplied. With an increase in speed (startup), the generator utilization remains at 100%, the excess power is stored in the storage capacitor.

During a subsequent idle phase, the storage capacitor is discharged again, so that the battery need not be cyclically loaded. However, as soon as a stipulated generator current is surpassed (the current value depends on the outside temperature, the generator temperature, the generator size, the internal combustion engine, the equipment of the vehicle, the transmission ratio, the idle speed, the possibility of increasing this speed), the control described above is activated according to FIG. 2. The lifetime of the battery can therefore be increased and the electrical system supply almost always ensured. The necessity to switch-off loads drops out and the probability of forced switching-off is significantly restricted. The size of the battery of the generator can also be made smaller.

Charging of battery 2 need not occur exclusively through generator 1, and battery 2 can also be charged by the storage capacitor 4, if its charge state drops below a threshold value and excess charge is available in the storage capacitor 4.

Since the storage capacitor 4 cannot hold the charge as long as the battery, the charge in the storage capacitor 4, after an engine stop may be transferred to battery 2, so that the battery 2, after an engine stop, is charged by the storage capacitor 4.

In an alternative embodiment of the method, follow-up loads and stand-by loads are supplied by the storage capacitor 4 by the engine stop. The follow-up loads concern the electrical water pump, in order to still circulate cooling water for a certain time after an engine stop, in order to avoid heat buildup. The engine control device also operates after an engine stop for a certain time, as does the door control device for central locking, etc. Standby loads include control devices that are situated in the sleep mode after engine stop and parking of the vehicle.

It is understandable to one skilled in the art that the process described above is interrupted at any site when it is recognized by the engine control that a change in type of operation has occurred, i.e., the transition from load operation to idle or fuel cutoff and the like. As already stated, the method is generally restarted automatically as soon as the command "end" has been reached, i.e., it is always restarted again at predetermined time intervals.

With the method according to the invention, the number of charging/discharge cycles of the battery can therefore be further reduced relative to the prior art.

Figure 3:
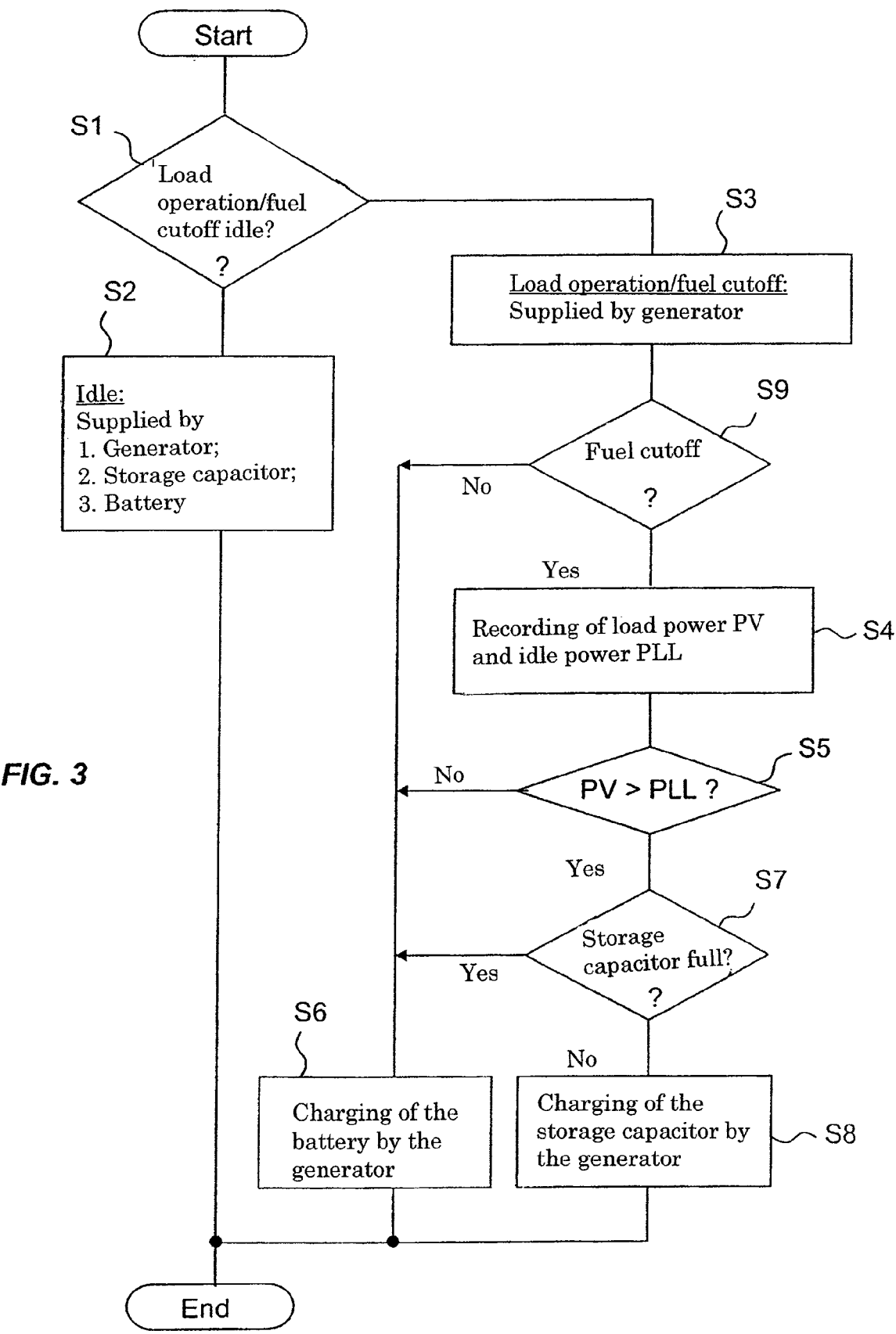
FIG. 3 shows a flow chart of another variant of the method according to the invention.

The invention is not restricted to the practical examples described above. Another variant of the method according to the invention is shown in FIG. 3. The method according to FIG. 3 differs from that of FIG. 2 in that before recording the instantaneously required load power PV and the nominal idle power PLL of the generator 1 in step 4, it is checked whether the vehicle is in load operation or fuel cutoff. In addition, the variant of the method according to FIG. 3 is the same as that of FIG. 2 and the steps that are identical in the two variants are not explained again below. In an exemplary embodiment of the method according to FIG. 3, the storage capacitor 4 is only charged when no fuel consumption is connected with this, i.e., when the generator is driven by the inertia of the vehicle. This is the case when the engine is off, i.e., during fuel cutoff. The query required for this after starting of the engine occurs in this variant before recording of the load power PV and the idle power PLL in step S4. If, in the query in step S9, it is found that the vehicle is not in fuel cutoff, i.e., it is in load operation, this means that fuel must be consumed to drive the vehicle. Loading of the generator, in order to supply additional loads, here storage capacitor 4, would represent a greater load for the internal combustion engine and therefore lead to increased fuel consumption. In this case, the method according to the invention is abbreviated and the excess electrical power already available is exclusively used to charge the battery. In the diagram of FIG. 3, this means that the jump occurs from step S9 to step S6, charging of the battery by generator 1.

If, on the other hand, it is found in the query in step S9 that the vehicle is in fuel cutoff, this means that the vehicle is moving only because of its inertia. The driver does not want any additional speed increase and even braking of the vehicle by the engine is desired. The "remaining" kinetic energy of the vehicle in this case is utilized to drive generator 1 and charge the storage capacitor 4 with the obtained electrical power. In this way, in the variant of the method according to the invention according to FIG. 3, the motion energy of the vehicle is optimally utilized and fuel is saved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an electrical system of a motor vehicle with a generator, a battery to supply the electrical system, at least one load and a storage capacitor for brief supply of electrical power on demand, in which the battery is charged when the generator produces excess electrical power, comprising the acts of:
   supplying the at least one load and charging the battery and the storage capacitor by the generator during load operation or fuel cutoff;
   supplying the at least one load by at least one of the battery and the storage capacitor when an instantaneous idle power of the generator is below a threshold;
   recording an instantaneously required electrical load power in load operation or fuel cutoff;
   comparing the load power with the idle power of the generator; and
   charging the storage capacitor by the generator when the idle power of the generator is less than the load power in load operation or fuel cutoff.

2. The method according to claim 1, wherein the storage capacitor is charged by the generator, if the idle power of the generator is less than the load power by a predetermined amount.

3. The method according to claim 1, wherein the storage capacitor is charged by the generator during fuel cutoff.

4. The method according to claim 1, wherein the storage capacitor and the battery are charged by the generator when the power that can be maximally transferred from the generator to the storage capacitor is less than the difference between the idle power of the generator and the load power.

5. The method according to claim 1, wherein follow-up loads and standby loads are supplied by the storage capacitor after engine stop.

6. The method according to claim 1, wherein the battery is charged by the storage capacitor after engine stop.

7. The method according to claim 1, wherein the battery is charged by the storage capacitor when its charge state drops below a threshold value and excess charge is present in the storage capacitor.

8. The method according to claim 1, wherein the method is automatically restarted at predetermined time intervals.

9. The method according to claim 2, wherein the storage capacitor is charged by the generator during fuel cutoff.

10. The method according to claim 2, wherein the storage capacitor and the battery are charged by the generator when the power that can be maximally transferred from the generator to the storage capacitor is less than the difference between the idle power of the generator and the load power.

11. The method according to claim 2, wherein follow-up loads and standby loads are supplied by the storage capacitor after engine stop.

12. The method according to claim 2, wherein the battery is charged by the storage capacitor after engine stop.

13. The method according to claim 2, wherein the battery is charged by the storage capacitor when its charge state drops below a threshold value and excess charge is present in the storage capacitor.

14. The method according to claim 2, wherein the method is automatically restarted at predetermined time intervals.

15. The method according to claim 3, wherein the storage capacitor and the battery are charged by the generator when the power that can be maximally transferred from the generator to the storage capacitor is less than the difference between the idle power of the generator and the load power.

16. The method according to claim 3, wherein follow-up loads and standby loads are supplied by the storage capacitor after engine stop.

17. The method according to claim 3, wherein the battery is charged by the storage capacitor after engine stop.

18. The method according to claim 3, wherein the battery is charged by the storage capacitor when its charge state drops below a threshold value and excess charge is present in the storage capacitor.

19. The method according to claim 3, wherein the method is automatically restarted at predetermined time intervals.

* * * * *